UNITED STATES PATENT OFFICE.

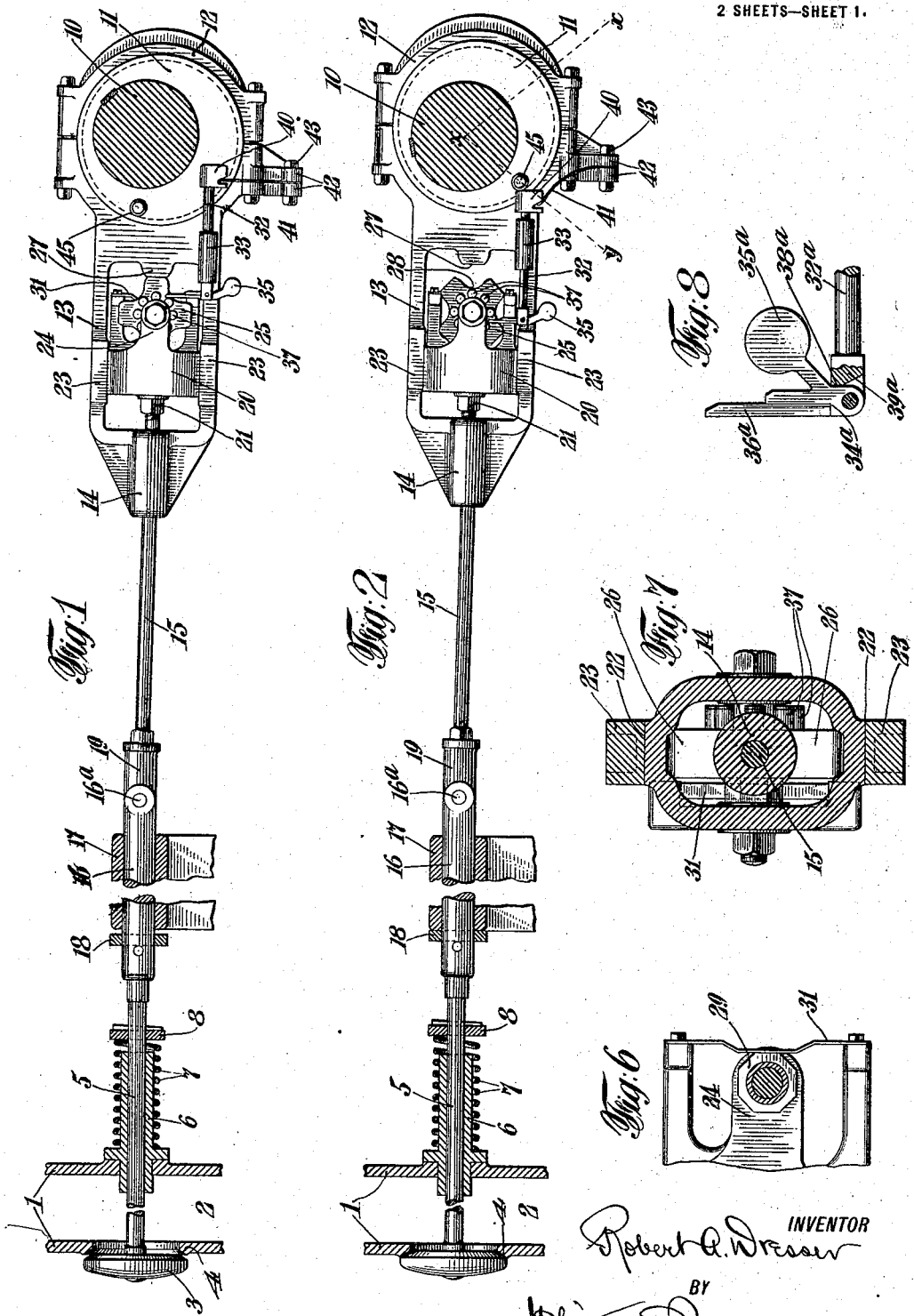

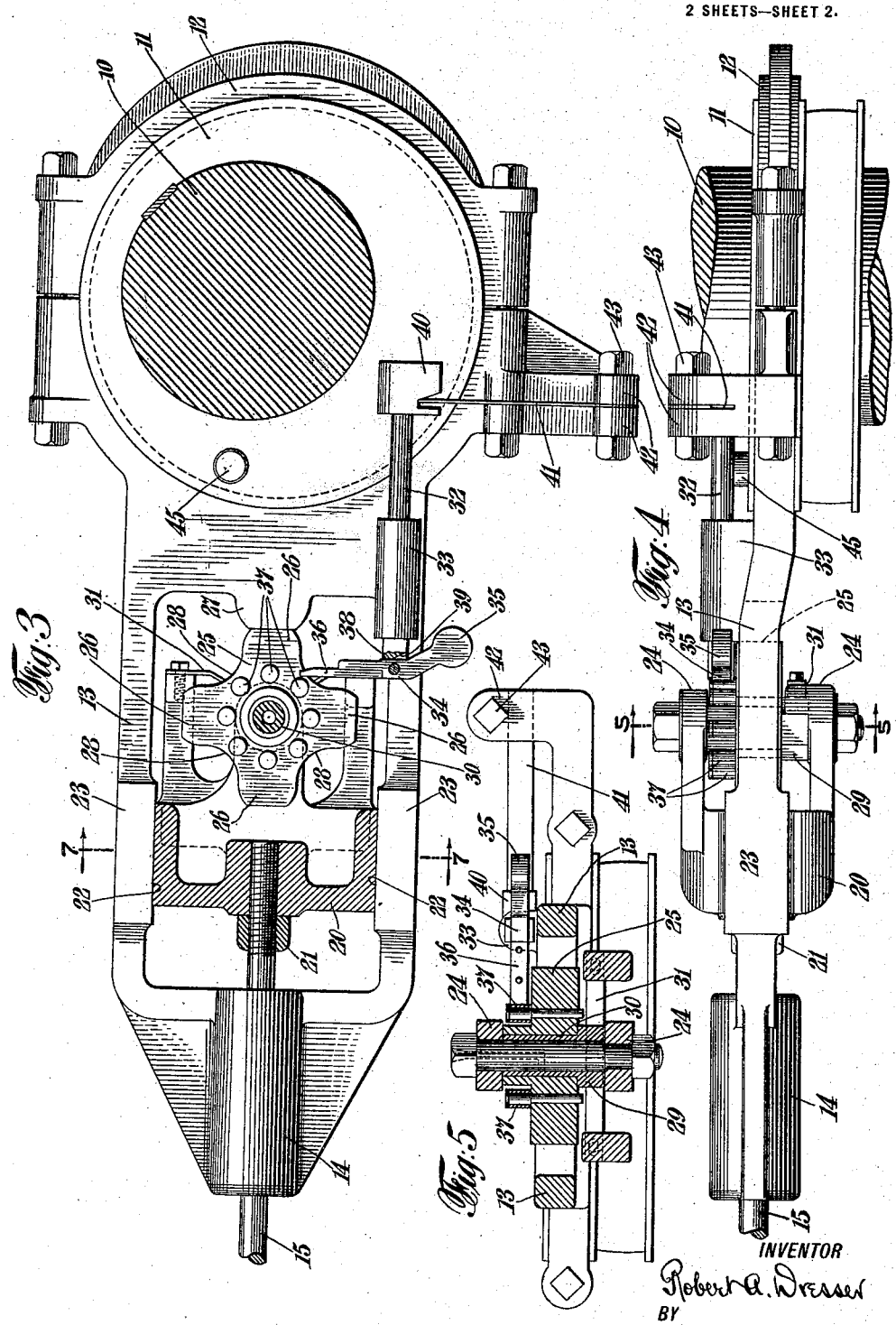

ROBERT A. DRESSER, OF BRADFORD, PENNSYLVANIA.

VALVE-OPERATING MECHANISM FOR INTERNAL-COMBUSTION ENGINES.

1,185,295.   Specification of Letters Patent.   Patented May 30, 1916.

Application filed July 13, 1915. Serial No. 39,704.

*To all whom it may concern:*

Be it known that I, ROBERT A. DRESSER, a citizen of the United States, residing at Bradford, in the county of McKean and State of Pennsylvania, have invented certain new and useful Improvements in Valve-Operating Mechanism for Internal-Combustion Engines; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one embodiment of the invention selected by me for purposes of illustration, and the said invention is fully disclosed in the following description and claims.

Referring to the said drawings: Figure 1 is a detail view, partly in section, illustrating the crank shaft of an internal combustion engine, a movable inlet or exhaust valve and one embodiment of my improved valve operating mechanism for operating the valve from the crank shaft at every alternate revolution of the same, the parts in this figure being shown in position to actuate the valve. Fig. 2 is a similar view showing the parts in the positions which they occupy during the revolution of the crank shaft in which the valve is not operated. Fig. 3 is an enlarged detail view, partly in section, of part of the mechanism illustrated in Figs. 1 and 2 adjacent to the crank shaft. Fig. 4 is a bottom plan view of the part shown in Fig. 3. Fig. 5 is a sectional view on line 5—5 of Fig. 4 looking in the direction of the arrows. Fig. 6 is a detail view of a part of the mechanism. Fig. 7 is a transverse sectional view on line 7—7 of Fig. 3. Fig. 8 is a detail view showing a slight modification of the shifting pawl which is specially adapted for use with vertically disposed valve actuating rods.

In internal combustion engines of the four cycle or Otto cycle type, as is well known, the piston in each cylinder makes four movements, or two reciprocations for each cycle, accompanied by two complete revolutions of the crank shaft of the engine to which the piston rod is connected. The exhaust valve and in many cases the inlet valve are operated positively in timed relation with the crank shaft, but each of said valves must be actuated only once in two revolutions of the crank shaft and for this purpose it is customary in engines of this kind to employ a second motion shaft, generally termed the cam shaft, or valve actuating shaft, or half speed shaft, which is connected by gearing with the crank shaft so as to rotate once for each two revolutions of the crank shaft, and mechanism is provided for directly actuating the exhaust valve and in some cases the inlet valve and igniters from this second motion shaft.

The object of my present invention is to dispense entirely with the second motion shaft and the gearing connecting the same with the crank shaft, and to actuate the exhaust valve of each cylinder, for instance, (and if desired the inlet valve and igniter) directly from the crank shaft by means of mechanism provided for the actuation of the valve (or other part) during every alternate revolution of the crank shaft and permitting it to remain in closed position during the other revolutions.

My invention also provides for imparting to the valve an opening and closing movement which extends through 180 degrees of crank travel which affords ample time for the exhausting of the engine cylinder in the case of an exhaust valve, and for the drawing in of a charge in case of an inlet valve, as the valve is maintained practically in open position during the entire stroke of the piston.

In the drawings, I have shown so much of an explosive engine of the horizontal type as is necessary for a clear understanding of my invention, although it is to be understood as hereinafter pointed out that my invention is equally applicable to the vertical type.

In the drawings, 1 represents a portion of an engine cylinder provided with an exhaust passage, 2, which is closed by an exhaust valve, 3, adapted to engage a valve seat, 4, and provided with a stem, 5, extending through a guiding sleeve or bushing, 6, and provided with a retracting spring, 7, which surrounds said sleeve and engages a collar, 8, secured to the valve stem, these parts being of usual or well known construction, the specific details of which form no part of my invention.

10 represents the crank shaft of the engine and in the embodiment of my invention herein shown it is provided with an eccentric, 11, which engages an eccentric strap, 12, provided with an open yoke, 13, the outer end of which is provided with a sleeve, 14, to receive the valve actuating rod, 15. The actuating rod, 15, is connected with the valve stem through the intervention of the usual valve slide, 16, held in a guide, 17, formed on or secured to the engine frame or cylinder, the outer end of the slide, 16, being in position adjacent to the valve stem and being provided with a collar or washer, 18, to limit the movement of the slide in a direction away from the valve stem. The other end of the valve slide is pivotally connected, at 16ª, to the usual rod end, 19, secured to the actuating rod, 15.

The valve actuating rod, 15, extends loosely through the sleeve, 14, at the outer end of the yoke, 13, connected with the eccentric strap, and said rod is provided within said yoke with a movable stroke transmitting or alternating device so constructed and operating that the rod, 15, will be actuated by the eccentric at every alternate revolution of the shaft, 10. In the present instance, I have shown the end of the rod 15 as screw threaded and screwed into a threaded opening in an eccentric slide, 20, and held securely in position by a set nut, 21. The eccentric slide, 20, is provided with guiding faces at top and bottom, indicated at 22, to engage bearing portions, 23, on the eccentric yoke, 13, and said eccentric slide is provided at opposite sides with bearing arms, 24, in which is mounted the movable stroke transmitting or alternating device which in the present instance is in the form of a star wheel, 25, provided with four lugs or projections, 26, disposed at equal distances around the center and having plane outer faces adapted to engage the plane outer face of a striker lug, 27, at the inner end of the eccentric yoke, 13, as clearly shown in the Figs. 1 and 3, the said star wheel being provided between the lugs or projections, 26, with recesses, 28, adapted to receive the striker lug, 27, in certain positions of the star wheel as shown in Fig. 2 and thus prevent the actuation of the rod, 15.

The alternating device or star wheel, 25, is preferably provided with means for holding it in one of its several positions, consisting in this instance of an octagonal device, 29, connected with the star wheel and in this instance formed on one end of a bushing, 30, extending through the star wheel and secured thereto, which coöperates with a flat spring 31, secured to inwardly projecting lugs on one of the bearing arms, 24, and having its central portions adapted to engage the flat or plane faces of the octagonal part, 29, so as to hold the alternating device or star wheel accurately in its alternating operative and inoperative positions. The lugs of the star wheel are shifted into and out of operative relation with the striker lug, 27, in this instance, by imparting to the star wheel or alternating device intermittently a partial revolution, in this instance, $\frac{1}{8}$ of a revolution. For this purpose I have provided a longitudinally movable shifting rod, 32, mounted in a guide, 33, on the eccentric yoke, 13, and provided at its outer end with a pivoted shifting pawl, 34, normally held in operative position by a weighted arm, 35, and provided with a hardened projecting plate, 36, riveted or otherwise secured to the pawl, 34, and forming a part thereof, the upper end of which is in a position to engage one of a series of eight circularly arranged studs or rollers, 37, on the star wheel for the purpose of imparting $\frac{1}{8}$ revolution thereto each time that the shifting rod, 32, is moved longitudinally in a direction toward the star wheel. The outer end of the shifting rod is preferably forked to embrace the pawl, 34, and is provided with a transversely disposed shoulder, 38, which prevents the backward movement of the upper end of the pawl, and with an inclined shoulder, 39, adjacent thereto, to permit the pawl to rock on the return movement of the shifting rod and pass over the studs or rollers, 37, of the star wheel which, at such time, will be held in its newly adjusted position by the engagement of the spring, 31, and one of the faces of the octagonal boss, 29.

The shifting rod, 32, may be retracted in any desired manner. In the present instance, I have shown the inner end of the shifting rod provided with an enlarged head, 40, notched to receive one end of the flat spring, 41, the outer end of which is clamped between lugs, 42, on the eccentric strap by a clamping bolt, 43. For the purpose of actuating the shifting rod at each revolution of the crank shaft, I preferably provide the eccentric, 11, with an actuating roller or stud, 45, which is secured to the eccentric adjacent to its periphery and in advance of the center of the eccentric, as will be seen best in Fig. 2 in which the dotted line, $x$—$x$, extends from the axis of the crank shaft through the center of the eccentric, and the dotted line $x$—$y$ extends from the center of the crank shaft through the center of the stud or roller, 45. This stud or roller, 45, is so located as to engage the head, 40, of the shifting rod, 32, thereby producing a longitudinal movement of the shifting rod with respect to the eccentric yoke, 13, before the yoke is moved forward by the eccentric, thus shifting the alternating device or star wheel before the stroke of the eccentric occurs, and as each revolution of the actuating stud or roll, 45, shifts the alternating device or star wheel $\frac{1}{8}$ of a revolution, it will be readily apparent that at every alternate stroke of the eccentric yoke, the striker lug, 27, will engage the end of one of the lugs, 26, thus imparting longitudinal movement to the valve actuating rod, 15, while on the intermediate strokes the striker lug, 27, will enter one of the recesses, 28, of the alternating device or star wheel and no movement whatever will be imparted to the rod, 15.

It will also be seen that as one of the lugs, 26, of the alternating device or star wheel is moved into position to be engaged by the striker lug, 27, as shown in Figs. 1 and 3, before the eccentric yoke begins its movement in a direction toward the valve, the valve rod will be actuated as soon as the said movement of the yoke commences thus opening the valve which will be held open until the center of the eccentric reaches a position substantially 180 degrees therefrom when the eccentric yoke will have been returned to the same position and the valve permitted to close. Hence a rotation of substantially 180 degrees or a half revolution of the crank shaft or ¼ of the cycle of the engine occurs between the opening and the closing of the valve, as will be readily understood.

I have stated heretofore that my invention is also applicable to engines in which the valve stems are disposed vertically, and in which it may be desirable that the valve actuating rods shall extend vertically from the crank shaft. The embodiment of my invention herein shown and described is applicable to such a construction with the exception that in such case the weighted arm, 35, of the shifting pawl would be obviously located on the other side of the pivot. Thus in Fig. 8, I have shown a modified form of pawl, 34$^a$, provided with a striking plate, 36$^a$, and weighted arm 35$^a$, located above the shifting rod, 32$^a$, which is provided with the transverse shoulder, 38$^a$, against which the pawl is held by the weighted arm, 35$^a$. This form of pawl could be used for a horizontally disposed actuating rod, but is particularly adapted for use with a construction in which the rod, 15, as well as the shifting rod, 32$^a$, is disposed vertically.

During the alternate reciprocations of the eccentric yoke, 13, when the recesses, 28, of the star wheel are brought into alinement with the striker lug, 27, it is obvious that the valve will not be actuated and that the sleeve, 14, will merely slide upon the rod, 15, and the bearing portions, 23, of the yoke will slide upon the faces, 22, of the eccentric slide and during this time the valve is held closed by its spring, 7, which is strong enough to over-come any frictional resistance between the eccentric yoke and the rod, 15, and slide, 20.

While I have shown my invention as applied to an exhaust valve it is obvious that it could also be readily applied to an inlet valve and also to an igniter mechanism, if desired, and may be used in any other connection in which the actuation of a part is desired one to every two revolutions of the actuating shaft.

What I claim and desire to secure by Letters Patent is:

1. The combination with a rotary shaft, an actuating device carried thereby, and a yoke operatively engaging said actuating device, of a reciprocating part having a slide engagement with said yoke, one of said parts being provided with a striking lug and the other of said parts being provided with a movable device adapted to be moved into and out of operative position with respect to said striking lug, and shifting mechanism operated by said rotary shaft for moving said alternating device into and out of operative position.

2. The combination with a rotary shaft, an actuating device carried thereby, a reciprocating yoke operated by said actuating device and provided with a striking part, of a reciprocating part independently movable with respect to said yoke and provided with a movable alternating device having portions adapted to be alternately brought into and out of said operative relation with said striking part and shifting mechanism operated by said rotary shaft for shifting said alternating device.

3. The combination with a rotary shaft, an actuating part carried thereby, and a reciprocating device operatively connected with said actuating part and provided with a striking part, of a reciprocating part independently movable with respect to said reciprocating device and having a sliding engagement therewith, a rotary alternating device carried by said reciprocating part and provided with alternating projecting portions for engaging the said striking part and recesses between said projections, shifting mechanism carried by said reciprocating device for bringing said recesses and projections alternately into alinement with said striking part and means operatively connected with said shaft for actuating said shifting mechanism.

4. The combination with a rotary shaft, an actuating part carried thereby, and a reciprocating device operatively connected with said actuating part and provided with a striking part, of a reciprocating part independently movable with respect to said reciprocating device and having a sliding engagement therewith, a rotary alternating device carried by said reciprocating part and provided with alternating projecting portions for engaging the said striking part and recesses between said projections, a circular series of projections on said rotary alternating device, a longitudinally movable shifting rod carried by said reciprocating device, and movable longitudinally with respect thereto, said shifting rod having a part adapted to engage the projections of said circular series of projections on the alternating device, and a part operatively connected with the shaft for engaging said shifting rod for intermittently shifting the position of said alternating device.

5. The combination with a rotary shaft, an actuating part carried thereby, and a reciprocating device operatively connected with said actuating part and provided with a striking point, of a reciprocating part independently movable with respect to said reciprocating device and having a sliding engagement therewith, a rotary alternating device carried by said reciprocating part and provided with alternating projecting portions for engaging the said striking part and recesses between said projections, yielding means for holding said alternating device in position with respect to said striking part, shifting mechanism carried by said reciprocating device and movable longitudinally with respect thereto, for positively shifting the said rotary alternating device and a part operatively connected with said shaft for actuating said shifting mechanism.

6. The combination with a rotary shaft of an eccentric secured thereto, an eccentric strap engaging said eccentric and provided with a yoke having a striking part, and a reciprocating rod having a sliding engagement with said yoke, of a rotary alternating device connected with said rod and provided with alternating projections adapted to engage the striking part of the yoke and recesses between said projections, and shifting mechanism for said rotary alternating device including a part movable longitudinally with respect to said yoke, and an actuating part on said eccentric for engaging said shifting mechanism.

7. The combination with a rotary shaft of an eccentric secured thereto, an eccentric strap engaging said eccentric and provided with a yoke having a striking part, and a reciprocating rod having a sliding engagement with said yoke, of a rotary alternating device connected with said rod and provided with alternating projections adapted to engage the striking part of the yoke and recesses between said projections, shifting mechanism for said rotary alternating device including a part movable longitudinally with respect to said yoke, and an actuating part for engaging and operating said shifting mechanism located on said eccentric in advance of the center of the actuating portion of said eccentric, for actuating said shifting mechanism before the movement of said yoke toward said reciprocating rod.

8. The combination with a rotary shaft, an eccentric mounted thereon, and an eccentric strap engaging said eccentric and provided with a yoke portion and with a striking lug, of a reciprocating rod having a guiding engagement with said yoke and provided with a rotary alternating device having alternating projections and recesses adapted to be brought into alinement with said striking part, yielding means for holding said alternating device in position, a longitudinally movable shifting rod carried by said yoke, and provided with an actuating pawl adapted to engage portions on said alternating device to partially rotate said device, a retracting spring for said shifting rod, and an actuating stud on said eccentric for engaging and actuating said shifting rod.

In testimony whereof I affix my signature.

ROBERT A. DRESSER.

Copies of this patent may be obtained for five cents each, by addressing the "Commissioner of Patents, Washington, D. C."